(12) United States Patent
Inoue et al.

(10) Patent No.: US 6,463,737 B2
(45) Date of Patent: Oct. 15, 2002

(54) MASTER CYLINDER

(75) Inventors: Hidefumi Inoue, Saitama-Ken (JP); Hiroyuki Oka, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 29 days.

(21) Appl. No.: 09/821,418

(22) Filed: Mar. 29, 2001

(65) Prior Publication Data

US 2001/0032464 A1 Oct. 25, 2001

(30) Foreign Application Priority Data

Apr. 19, 2000 (JP) ........................................ 2000-118440

(51) Int. Cl.$^7$ ............................................... B60T 11/20
(52) U.S. Cl. ...................................................... 60/562
(58) Field of Search ...................... 60/562, 588; 92/128, 92/130 R, 135

(56) References Cited

U.S. PATENT DOCUMENTS

| | | | | |
|---|---|---|---|---|
| 4,989,498 A | | 2/1991 | Mori et al. .................... | 60/562 |
| 5,036,751 A | * | 8/1991 | Seip et al. ..................... | 60/562 |
| 5,179,834 A | * | 1/1993 | Rauschenbach ............... | 60/562 |
| 5,560,206 A | | 10/1996 | Yanagi et al. .................. | 92/135 |
| 5,636,517 A | * | 6/1997 | Mallmann ..................... | 60/562 |
| 5,946,914 A | | 9/1999 | Crumb et al. .................. | 60/585 |

\* cited by examiner

*Primary Examiner*—Edward K. Look
*Assistant Examiner*—Thomas E. Lazo
(74) *Attorney, Agent, or Firm*—Flynn, Thiel, Boutell & Tanis, P.C.

(57) ABSTRACT

As the primary piston 3 is driven forward, a cup seal 32 moves forwardly of a communication path 17c in a first sleeve 17 to interrupt a communication between a first reservoir chamber 11 and the first liquid pressure chamber 5, thus generating a liquid pressure in the first liquid pressure chamber 5. As the secondary piston 10 is driven forward, a cup seal 25 moves forwardly of a communication path 18c, interrupting a communication between a second reservoir chamber 19 and a second liquid pressure chamber 6, thus generating a liquid pressure in the second liquid pressure chamber 6. The invention provides a master cylinder 1 which is simple in construction and inexpensive to manufacture.

7 Claims, 5 Drawing Sheets

MASTER CYLINDER

FIELD OF THE INVENTION

The invention relates to a master cylinder which represents a component of a brake system for automobiles.

DESCRIPTION OF THE PRIOR ART

A master cylinder is well known in the art which comprises a primary piston disposed to be movable within an axial bore of a housing toward a rear end thereof, a secondary piston disposed to be movable within the axial bore of the housing toward a front end thereof, a first liquid pressure chamber in which a braking liquid pressure is generated as the primary piston is driven forward, and a second liquid pressure chamber in which a braking liquid pressure is generated as the secondary piston is driven forward.

Conventional master cylinders are categorized into "a port type", "a center valve type" and "a plunger type".

The master cylinders of "center valve type" and "plunger type" are increasingly finding their applications recently as ABS (anti-skid brake system) is becoming popular.

A conventional master cylinder of "plunger type" includes a primary and a secondary piston, between which a piston return spring is held compressed. At this end, the opposite ends of the return spring are provided with retainers, which are fastened to stems, resulting in an increased number of parts, and hence, an increased cost of the master cylinder.

A master cylinder of plunger type also includes a sleeve disposed within the housing and which is formed with an axial groove, which receives a retraction limit member which is integrally formed with a return spring retainer associated with the primary piston. This presents a difficulty in assembly, and also results in a complicated construction and an increased cost.

SUMMARY OF THE INVENTION

It is an object of the invention to provide a master cylinder which is relatively simple in construction and inexpensive to manufacture.

Specifically, the present invention relates to a master cylinder comprising a primary piston disposed to be reciprocable within an axial bore of a housing toward a rear end thereof, the primary piston having a step defined between a reduced diameter and an increased diameter portion; a secondary piston disposed to be reciprocable within the axial bore toward a front end thereof and having an axial bore which is open rearward; a first sleeve disposed rearward of the secondary piston and slidably fitted into the inner peripheral surface of the housing; a first reservoir chamber defined by the inner peripheral surface of the axial bore in the secondary piston and the reduced diameter portion of the primary piston and into which a braking liquid from a reservoir is normally introduced; a first liquid pressure chamber defined between the increased diameter portion of the primary piston, the first sleeve and the inner peripheral surface of the housing; and a second liquid pressure chamber defined within the housing at a location adjacent to the secondary piston for generating a liquid pressure as the secondary piston is driven forward. In accordance with the present invention, the reduced diameter portion of the primary piston is slidably fitted into the axial bore formed in the secondary piston, and either the first sleeve or the secondary piston is provided with a retraction limit member which restricts a retraction limit of the primary piston.

With the arrangement of the present invention, no retainers or stems are used which are used in a conventional arrangement for holding the return spring compressed, thus allowing the number of parts used to be reduced a in a conventional master cylinder. Accordingly, it is possible to provide a master cylinder which is simple in construction and inexpensive manufacture in comparison to the prior art.

Above and other objects, features and advantaged of the invention will become apparent from the following description of several embodiments thereof with reference to the attached drawings.

DETAILED DESCRIPTION OF THE EMBODIMENTS

Figure 1:
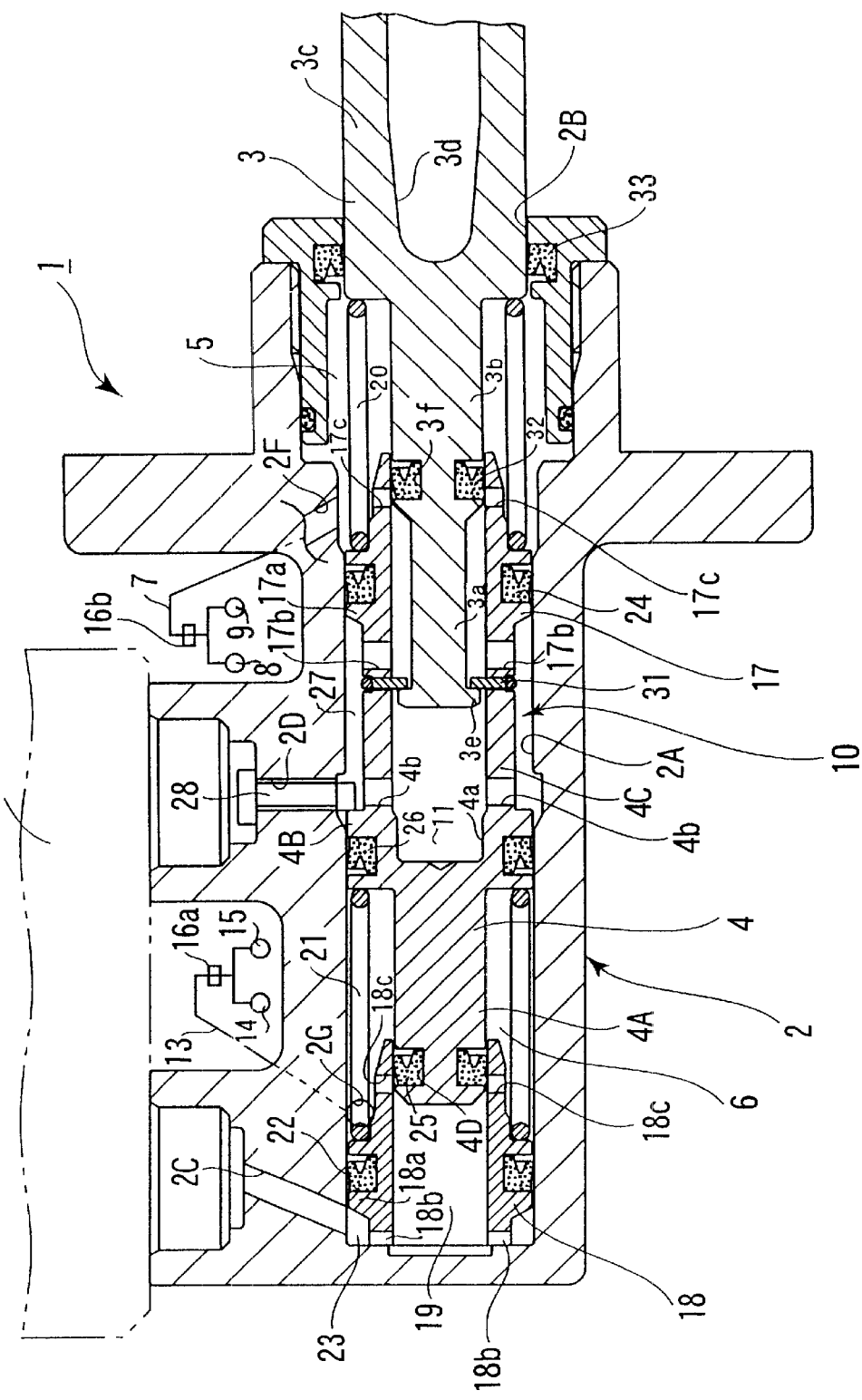
FIG. 1 is a longitudinal section of one embodiment of the invention.

Referring to the drawings, several embodiments of the invention will now be described. Referring to FIG. 1, there is shown a master cylinder 1 of a tandem type, comprising a primary piston 3 and a secondary piston 10 which are disposed to be movable within a housing 2, and a first and a second liquid pressure chamber 5 and 6 which are defined within the housing 2.

While this will be described in more detail later, the first liquid pressure chamber 5 is normally in communication with wheel cylinders 8, 9 through a conduit 7, and is also capable of communicating with a reservoir 12 of braking liquid through a first reservoir chamber 11. The second liquid pressure chamber 6 is normally in communication with wheel cylinders 14, 15 through a conduit 13, and is also capable of communicating with the reservoir 12 through a second reservoir chamber 19.

When a brake pedal, not shown, is driven forward, an output shaft of a brake booster, not shown, is also driven in response thereto, and as a consequence, the primary piston 3 and the secondary piston 10 are driven forward, thus generating the liquid pressures in the first liquid pressure chamber 5 and the second liquid pressure chamber 6. The liquid pressures generated in the first liquid pressure chamber 5 and the second liquid pressure chamber 6 are transmitted to the wheel cylinders 8, 9, 14, 15, through the conduits 7, 13, thus operating these wheel cylinders to produce a braking effort.

Liquid pressure control means 16a, 16b, which are known in themselves in the art for providing an anti-skid control, are disposed in the conduit 7, 13, respectively. A controller, not shown, controls the operation of the liquid pressure control means 16a, 16b, thus allowing the anti-skid control to be performed.

In the present embodiment, the both pistons 3 and 10 and their related portions are improved in order to provide a master cylinder 1 which is simple in construction and inexpensive to manufacture. Specifically, the housing 2 is formed with a stepped axial bore 2A which has an increased diameter towards its rear end, and the axial bore 2A continues to a through-opening 2B which extends through the rear end face of the housing.

A first sleeve 17 is fitted into the rear portion of the axial bore 2A while a second sleeve 18 is fitted into the front portion of the axial bore 2A. A body 4 in the form of a stepped solid cylinder is slidably fitted into the axial bore 2A at a location between the second sleeve 18 and the first sleeve 17.

As will be described in further detail later, in the present embodiment, the first sleeve 17 and the body 4 which is disposed adjacent to and forwardly thereof are formed integrally to define the secondary piston 10.

A spring 20 is disposed between the first sleeve 17 and the primary piston 3, and a spring 21 is disposed between the second sleeve 18 and the body 4 of the secondary piston 10. In this manner, the front end face of the first sleeve 17 is normally disposed in abutment against a retainer 31 mounted on the rear end of the body 4 while the front end face of the second sleeve 18 is normally disposed in abutment against the front end face of the axial bore 2A.

The second sleeve 18 includes an outer periphery 18a towards its front end which is of an increased diameter than the rear side thereof, and a cup seal 22 which is C-shaped in section is mounted in an annular groove which is formed by the increased diameter portion 18a to maintain a liquid tightness between the outer peripheral surface of the increased diameter portion 18a and the inner peripheral surface of the axial bore 2A while simultaneously partitioning the space on the outer peripheral side of the second sleeve 18 into a front and a rear portion which are located forwardly and rearwardly of the increased diameter portion 18a. The internal space of the second sleeve 18 defines a second reservoir chamber 19.

At its front end, the second sleeve 18 is formed with a plurality of notches 18b at a plurality of circumferentially spaced positions, which allows the second reservoir chamber 19 to normally communicate with the reservoir 12 through the annular space 23 located outward of the notches 18b and a radial passage 2C in the housing 2. Thus, the braking liquid contained in the reservoir 12 is normally introduced into the second reservoir chamber 19.

The second sleeve 18 is formed with a plurality of communication paths 18c, in the form of radial openings, at a location axially rearward of the increased diameter portion 18a, thereby allowing a communication between the inside and the outside of the second sleeve 18. In other words, the communication paths 18c allows a communication between the liquid pressure chamber 6 and the second reservoir chamber 19.

On the other hand, the first sleeve 17 is formed generally in the similar configuration as the second sleeve 18, and a cup seal 24 which is C-shaped in section is mounted in an annular groove formed in its increased diameter portion 17a, thus maintaining the liquid tightness between the outer peripheral surface of the increased diameter portion 17a and the inner peripheral surface of the axial bore 2A.

The first sleeve 17 is formed with a plurality of radial through-openings 17b at a location forward of the increased diameter portion 17a, and is also formed with a plurality of communication paths 17c, in the form of radial openings, at a location rearward of the increased diameter portion 17a. The plurality of through-openings 17b and communication paths 17c allow a communication between the inside and the outside of the first sleeve 17.

As mentioned above, the first sleeve 17 is formed integrally with the body 4, and accordingly, the internal space within the bottomed opening 4a of the body 4 continues to the internal space of the first sleeve 17 to define together the first reservoir chamber 11, which in turn communicate with the first liquid pressure chamber 5 through the communication paths 17c formed in the first sleeve 17.

As mentioned above, in the present embodiment, the secondary piston 10 comprises the body 4 in the form of the stepped solid cylinder having the bottomed opening 4a which is open in the rearward direction, and the first sleeve 17 which is disposed rearward of the body 4 and formed integrally therewith. By contrast, the primary piston 3 is in the form of a stepped solid cylinder which has a sequentially increasing diameter in the rearward direction.

The body 4 of the secondary piston 10 includes a reduced diameter portion 4A which is located forwardly, an increased diameter portion 4B which is centrally located and an intermediate diameter portion 4C which is located rearward. The outer periphery of the reduced diameter portion 4A is formed with an annular groove 4D toward the front end in which a cup-seal 25 which is C-shaped in section is mounted. The front outer periphery of the reduced diameter portion 4A in which the cup-seal 25 is mounted is slidably fitted into the second sleeve 18. An internal space of the second sleeve 18 which is defined between the front end face of the reduced diameter portion 4A and the opposing end face of the axial bore 2A defines the second reservoir chamber 19.

At the same time, the increased diameter portion 4B is slidably fitted into the axial bore 2A. The outer periphery of the increased diameter portion 4B is also formed with an annular groove, in which an annular seal member 26 is mounted, thus maintaining a liquid tightness between the axial bore 2A and the increased diameter portion 2B.

An internal space of the axial bore 2A which is located between the increased diameter portion 4B and the opposing increased diameter portion 18a of the second sleeve 18 and disposed outwardly of the reduced diameter portion 4A of the body 4 and the second sleeve 18 defines the second liquid pressure chamber 6, which in turn communicates with the conduit 13 through a discharge port 2G formed in the housing 2.

The intermediate diameter portion 4C of the body 4 is formed with a plurality of radial openings 4b, through which the internal space of the bottomed opening 4a (the first reservoir chamber 11) and an annular passage 27 located outward of the intermediate diameter portion 4C normally communicate with each other.

The annular passage 27 comprises an annular space which is defined by the increased diameter portion 4B of the body 4, the opposing increased diameter portion 17a of the first sleeve 17, the inner peripheral surface of the axial bore 2A, the opposing body 4 and the outer peripheral surface of the first sleeve 17. The annular passage 27 normally communicates with the reservoir 12 through a radial passage 2D formed in the housing 2, and also normally communicates with the first reservoir chamber 11 through the radial opening 4b in the body 4 and the through-opening 17b in the first sleeve 17. In other words, the reservoir 12 and the first reservoir chamber 11 are normally in communication with each other through the radial passage 2D, the annular passage 27, the radial opening 4b and the through-opening 17b, whereby the braking liquid is introduced into the first reservoir chamber 11.

The spring 21 is disposed within the second liquid pressure chamber 6, and its resilience normally urges the secondary piston 10 rearward. In the present embodiment, a stop pin 28 is inserted into the radial opening 2D in the housing 2 from the radially outer side (or upper side) and the inner end of the stop pin 28 projects inwardly beyond the inner peripheral surface of the axial bore 2A.

In this manner, the secondary piston 10 which is urged rearward by the spring 21 is maintained in a position such that the rear end face of the increased diameter portion 4B of the body 4 abuts against the inner end of the stop pin 28. Thus, in the inoperative condition shown, the secondary piston 10 is maintained in its retracted end position where it abuts against the stop pin 28, acting as a retraction limit member.

It is to be noted that the cross-sectional area with which the body 4 faces the second liquid pressure chamber 6 is chosen to be substantially equal to the cross-sectional area with which the first sleeve 17 faces the first liquid pressure chamber 5.

Figure 2:
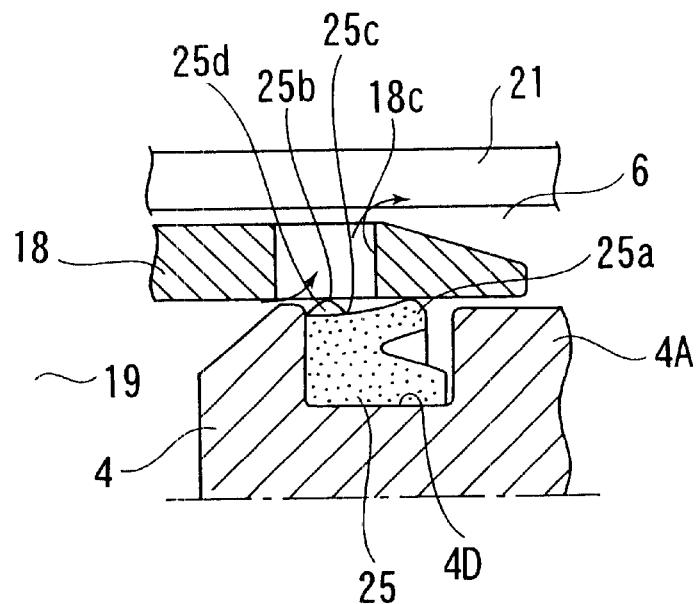
FIG. 2 is an enlarged view of part shown in FIG. 1.

In this inoperative condition, one-half the inner opening of the communication paths 18c formed in the second sleeve 18 is axially overlapped by the outer extremity of the cup seal 25 (see FIG. 2).

As shown in FIG. 2, the reduced diameter portion 4A in which the cup seal 25 is provided has an external diameter which is slightly less than the internal diameter of the second sleeve 18, whereby a clearance is created between the outer peripheral surface of the reduced diameter portion 4A of the body 4 and the inner peripheral surface of the second sleeve 18 which allows the braking liquid to pass therethrough.

Accordingly, in the inoperative condition shown, the braking liquid in the second reservoir 19 can flow into the second liquid pressure chamber 6 through the clearance between the outer peripheral surface of the reduced diameter portion 4A of the body 4 and the inner peripheral surface of the second sleeve 18 and through the communication path 18c. At the same time, the cup seal 25 functions as a check valve, thus allowing the braking liquid in the second reservoir chamber 19 to flow into the second liquid pressure chamber 6 through the clearance between the outer peripheral surface of the reduced diameter portion 4A of the body 4 and the inner peripheral surface of the second sleeve 18 by moving past the outer extremity of the cup seal 25 while blocking a flow of the braking liquid from the second liquid pressure chamber 6 into the second reservoir chamber 19 by moving past the outer extremity of the cup seal 25.

By contrast, when the secondary piston 10 is driven forward, the outer extremity of the cup seal 25 is displaced forward of the inner opening of the communication path 18c, thus blocking a communication between the second reservoir chamber 19 and the second liquid pressure chamber 6 through the communication path 18c. Accordingly, a liquid pressure is generated in the second liquid pressure chamber 6 to operate the wheel cylinders 14, 15.

In the present embodiment, an arrangement is made to increase the useful life of the cup seal 25 itself by improving the outer extremity (or outer periphery) thereof. Specifically, referring to FIGS. 2 and 3, the outer extremity of the cup seal 25 is formed, at its rear portion, in the form of a high pressure lip 25a in the similar manner as in the prior art. However, at its front portion, the outer extremity of the cup seal 25 bulges radially outward to form low pressure lips 25b which are chevron-shaped in section, thus forming an annular groove 25c between the low pressure lips 25b and the high pressure lip 25a. At three points which are circumferentially spaced abut, axial grooves 25d are formed between the low pressure lips 25b and communicate with the annular groove 25c.

As a result of such improvement of the cup seal 25 itself in the present embodiment, when the low pressure lips 25b and the high pressure lip 25a move forwardly of communication path 18c to interrupt the communication between the second reservoir chamber 19 and the second liquid pressure chamber 6 through the communication path 18c to generate a liquid pressure in the second liquid pressure chamber 6, the higher liquid pressure in the second liquid pressure chamber 6 acts on the high pressure lip 25a from the rear side while the lower liquid pressure in the second reservoir chamber 19 acts on the low pressure lips 25b and the annular groove 25c from the front side.

In the inoperative condition shown in FIG. 2, the braking liquid can flow from the second reservoir chamber 19 into the second liquid pressure chamber 6 through the communication path 18c, and the braking liquid which is introduced into the annular groove 25c from the second reservoir chamber 19 can flow past the high pressure lip 25a and then flow through the clearance between the outer periphery of the reduced diameter portion 4A and the inner periphery of the second sleeve 18 into the second liquid pressure chamber 6.

Returning to FIG. 1, the primary piston 3 will be described. The primary piston 3 comprises a reduced diameter portion 3a which is located axially forwardly, an intermediate diameter portion 3b which is located centrally and an increased diameter portion 3c which is located rearward.

The rear end face of the increased diameter portion 3c is formed with a bottomed opening 3d, into which the free end of an output shaft from a booster, not shown, is inserted.

At its front end, the reduced diameter portion 3a is formed with a flange 3e which bulges radially outward.

The flange 3e of the primary piston 3 and the reduced diameter portion 3a are disposed to extend through the first sleeve 17, and the flange 3e is positioned within the bottomed opening 4a of the body 4. A front portion of the intermediate diameter portion 3b of the primary piston 3 is slidably fitted into the first sleeve 17 while the increased diameter portion 3c of the primary piston 3 slidably extends through the through-opening 2B of the housing 2.

At a location immediately rearward of the flange 3e of the primary piston 3, the reduced diameter portion 3a is engaged by a C-shaped retainer plate 31, which is detented to the secondary piston 10.

The spring 20 is disposed between the rear end face of the increased diameter portion 17a of the first sleeve 17 and the opposing stepped end face of the primary piston 3, thus normally urging the first sleeve 17 (secondary piston 10) and the primary piston 3 axially spaced apart.

The retainer 31 is initially passed through a radial opening formed at a boundary between the body 4 and the first sleeve 17 before it is engaged with the reduced diameter portion 3a of the primary piston 3, and under this condition, it is detented to the body 4 by a ring-shaped pin. In the inoperative condition shown, the primary piston 3 which is urged rearward is maintained at its retracted end where the flange 3e abuts against the retainer 31, functioning as retraction limit member.

In other words, in the inoperative condition shown, the body 4 of the secondary piston 10 is maintained at its retracted end by means of the stop pin 28, while the primary piston 3 is maintained at its retracted end by the retainer 31. Since the body 4 and the first sleeve 17 are formed integrally to define the secondary piston 10, they move back and forth in an integral manner.

A seal member 33 is mounted in the inner periphery of the through-opening 2B formed in the housing 2, thus maintaining a liquid tightness between the inner peripheral surface of the through-opening 2B and the increased diameter portion 3c of the primary piston 3. On the other hand, the intermediate diameter portion 3d of the primary piston 3 which is fitted into the first sleeve 17 is formed with an annular groove 3f, into which a cup seal 32, which is similar to the cup seal 25 mentioned above, is mounted.

The first liquid pressure chamber 5 comprises an internal space of the axial bore 2A which is located rearward of the increased diameter portion 17a of the first sleeve 17 and located radially outward of the outer periphery of the first sleeve 17, the intermediate diameter portion 3b and the increased diameter portion 3c of the primary piston 3. The first liquid pressure chamber 5 is normally connected to wheel cylinders 8, 9 through a discharge portion 2F formed in the housing 2 and the conduit 7 connected thereto.

The first reservoir chamber 11 comprises an internal space of the first sleeve 17 in which the reduced diameter portion 3a and the flange 3e of the primary piston 3 are inserted and the bottomed opening 4a of the body 4.

In the inoperative condition shown in FIG. 1, one-half the inner opening of the communication path 17c of the first sleeve 17 is axially overlapped by the cup seal 32 on the primary piston 3.

The intermediate diameter portion 3d of the primary piston 3 which has the cup seal 32 mounted thereon has an external diameter which is slightly less than the internal diameter of the first sleeve 17, whereby a clearance is created between the outer peripheral surface of the intermediate diameter portion 3d of the primary piston 3 and the inner peripheral surface of the first sleeve 17 which allows a braking liquid to pass therethrough. The outer extremity of the cup seal 32 is constructed in the similar manner as the outer extremity of the cup seal 23 shown in FIGS. 2 and 4, and thus the outer extremity of the cup seal 32 is in close contact with the inner peripheral surface of the first sleeve 17.

Accordingly, in the inoperative condition shown, the braking liquid in the first reservoir chamber 11 can flow into the first liquid pressure chamber 5 through the clearance between the outer peripheral surface of the intermediate diameter portion 3b of the primary piston 3 and the inner peripheral surface of the first sleeve 17 and the communication path 17c and is also allowed by the cup seal 32 which functions as a check valve to flow past the outer extremity thereof to flow into the first liquid pressure chamber 5 also through the clearance between the outer peripheral surface of the intermediate diameter portion 3b of the primary piston 3 and the inner peripheral surface of the first sleeve 17. On the other hand, a flow of the braking liquid from the first liquid pressure chamber 5 into the first reservoir chamber 11 by moving past the outer extremity of the cup seal 32 is prevented.

In contrast to the inoperative condition which is mentioned immediately above, as the primary piston 3 is driven forward, it is also driven forward relative to the secondary piston 10 (first sleeve 17), whereby the outer extremity of the cup seal 32 slides forwardly moving past the inner opening of the communication path 17c, thus blocking a communication between the first reservoir chamber 11 and the first liquid pressure chamber 5 through the communication path 17c. As a consequence, a liquid pressure is generated in the first liquid pressure chamber 5 to operate the wheel cylinders 8, 9.

Operation

With the described arrangement, in the inoperative condition when a brake pedal, not shown, is not depressed, the primary piston 3 which is urged by the spring 20 is maintained at its retracted end position shown, and the secondary piston 10 which is urged by the spring 21 is also located at its retracted end position where the body 4 abuts against the stop pin 28. A communication between the second reservoir chamber 19 and the second liquid pressure chamber 6 is maintained through the communication path 18c in the second sleeve 18, and thus the braking liquid having an atmospheric pressure is introduced into the second reservoir chamber 19 and the second liquid pressure chamber 6. A communication between the first reservoir chamber 11 and the first liquid pressure chamber 5 is maintained through the communication path 17c in the first sleeve 17, and accordingly, the braking liquid having an atmospheric pressure is introduced into the first reservoir chamber 11 and the first liquid pressure chamber 5.

However, when a brake pedal, not shown, is depressed, the primary piston 3 is driven forward by an output shaft of a brake booster in response thereto, whereby the cup seal 32 moves forwardly of the communication path 17c, thus interrupting the communication between the first reservoir chamber 11 and the first liquid pressure chamber 5 through the communication path 17c. Accordingly, a liquid pressure is generated in the first liquid pressure chamber 5.

As the liquid pressure is generated in the first liquid pressure chamber 5, the spring 21 is compressed to drive the secondary piston 10 forwardly. Accordingly, the cup seal 25 slides forwardly of the communication path 18c in the second sleeve 18, thus interrupting a communication between the second reservoir chamber 19 and the second liquid pressure chamber 6 through the communication path 18c in the second sleeve 18, and thus generating a liquid pressure in the second liquid pressure chamber 6.

The liquid pressures generated in the first pressure chamber 5 and the second liquid pressure chamber 6 act on the wheel cylinders 8, 9, 14 and 15 to operate them to produce a required braking effort.

It will be seen from the foregoing description that in the present embodiment, no valve mechanism is provided inside the pistons 3 and 10, and the cup seals 25 and 32 which functions as check valves are mounted in the annular grooves which are located around the outer periphery of the pistons 3 and 10.

Consequently, it will be seen that in comparison to a master cylinder of a center valve type which is generally employed in the prior art and including a valve mechanism inside each piston 3, 10, the axial size of the master cylinder 1 can be reduced, and retainers and stems which are used in the prior art can be omitted, allowing the internal construction of the master cylinder 1 to be simplified. Such a reduction in the axial size of the master cylinder 1 is favorable in assembling the master cylinder on a vehicle.

It will also be seen that the assembly of the master cylinder 1 is facilitated by simply mounting the cup seals 25 and 32 in the annular grooves 4D and 3f of the both pistons 3 and 10.

By contrast, with the master cylinder of a plunger type commonly employed in the prior art where a cup seal is mounted in an annular groove formed around the inner peripheral surface of the axial bore 2A of the housing 2, the internal construction of the housing 2 is more complicated and the assembly of the master cylinder is cumbersome.

Thus, in comparison to the prior art, the provision of the annular grooves 4D and 3f in which the cup seals 25 and 32 are to be mounted and which are formed around the outer periphery of the pistons 3 and 10, simplifies the construction of the master cylinder 1 and reduces the cost required. As a consequence, there can be provided a master cylinder 1 which is simpler in construction and more inexpensive in comparison to the prior art.

Figure 3:
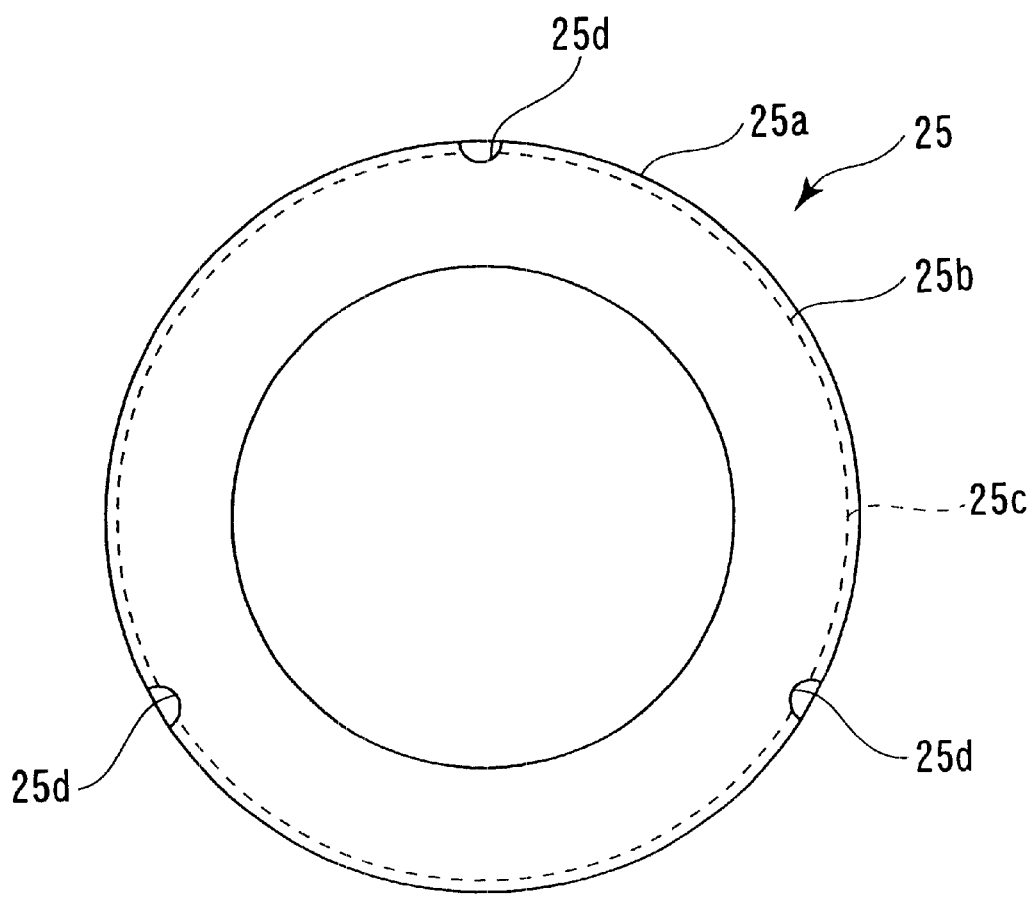
FIG. 3 is a front view of a cup seal shown in FIG. 1.

As shown to an enlarged scale in FIGS. 2 and 3, in the present embodiment, the outer extremity of the cup seal 25 is formed as a high pressure lip 25a at its rear portion and as a low pressure lip 25b at its front portion, with three axial grooves 25d formed in the low pressure lip to introduce the braking liquid into the annular groove 25c.

Consequently, when the master cylinder is operative, the higher liquid pressure from the second liquid pressure chamber 6 acts on the high pressure lip 25a while the lower braking liquid pressure acts on the low pressure lip 25b and the annular groove 25c.

The presence of the braking liquid in the annular groove 25c allows the pressure with which the high pressure lip 25a is urged against the opening of the communication path 18c to be reduced as the high pressure lip 25a moves across the inner opening of the communication path 28c. This allows the sliding resistance of the cup seal 25 to be reduced, thus suppressing a damage to the high pressure lip 25a and contributing to increasing the useful life of the cup seal 25.

The same is true with the cup seal 32 which is constructed in the similar manner as the cup seal 25 and which is used with the primary piston 3, again contributing to increasing the useful life thereof.

As will be noted from FIG. 2, in the present embodiment, three axial grooves 25d are formed through the low pressure lips 25b of the cup seal 25. This allows the axial region through which the braking liquid can pass from the second reservoir chamber 19 into the communication path 18c to be increased than when the axial grooves 25d are not provided. This means that the channel resistance as the braking liquid from the second reservoir chamber 19 passes to the second liquid pressure chamber 6 through the communication path 18c is reduced, thus improving the suction of the braking liquid from the second reservoir chamber 19 into the second liquid pressure chamber 6. The same is true with the cup seal 32 associated with the primary piston 3.

It will be understood from FIG. 2, that in the present embodiment, axial grooves 25d are formed at three locations in the low pressure lips 25b of the cup seal 25. In comparison to the choice in which the axial grooves 25d are not provided, this increases axial regions through which the braking liquid can pass from the second reservoir chamber 19 to the communication path 18c. Accordingly, the channel resistance encountered when the braking liquid in the second reservoir chamber 19 flows through the communication path 18c toward the second liquid chamber is reduced, thus improving the suction effect which causes the braking liquid to flow from the second reservoir chamber 19 into the second liquid pressure chamber 6. The same is true with the cup seal 32 associated with the primary piston 3.

Liquid pressure control means 16a and 16b shown in FIG. 1 which provide an anti-skid control comprises a pump or valve in a known arrangement. When an anti-skid control is performed by the liquid pressure control means 16a and 16b, the braking liquid in the conduit 7 and 13 are returned to the both liquid pressure chambers 5 and 6. If the cup seal 25 is located at the inner opening of the communication path 18c at this time, there are axial grooves 25d in the low pressure lips 25b. If there is a pressure differential between the second reservoir chamber 19 and the second liquid pressure chamber at that time, a resulting damage imparted to the cup seal 25 by such pressure differential can be prevented. The same is true with the cup seal 32 associated with the primary piston 3.

Initial Phase of Operation

Figure 4:
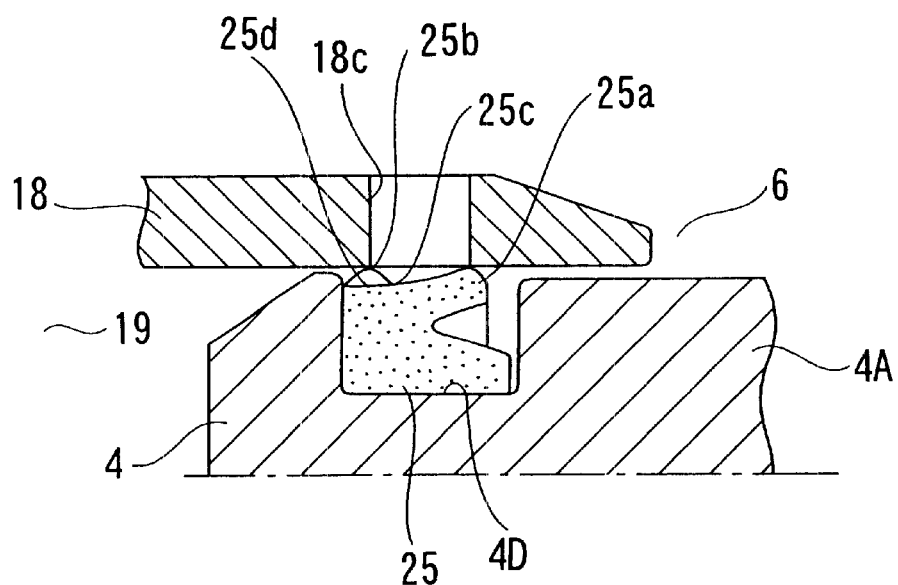
FIG. 4 is a longitudinal section illustrating an initial phase of operation of the part shown in FIG. 1.

FIG. 4 shows an initial phase of operation of a process in which the cup seal 25 is displaced forwardly of the communication path 18c from the inoperative condition shown in FIG. 2. During the initial phase of operation as shown in FIG. 4, the low pressure lips 25b of the cup seal 25 are in close contact with the inner peripheral surface of the second sleeve 18 at a location forwardly of the inner opening of the communication path 18c. At this time, the braking liquid can flow from the second reservoir chamber 19 into the communication path 18c only through the axial grooves 25d provided at three locations. In other words, during the initial phase of operation, the axial grooves 25d formed in the cup seal 25 as well as corresponding axial grooves formed in the cup seal 32 which are constructed similarly as in the cup seal 25 function as orifices. This permits a lost motion of a brake pedal during the initial phase of operation to be reduced, permitting a good brake feeling to be obtained during the initial phase of operation.

Second Embodiment

Figure 5:
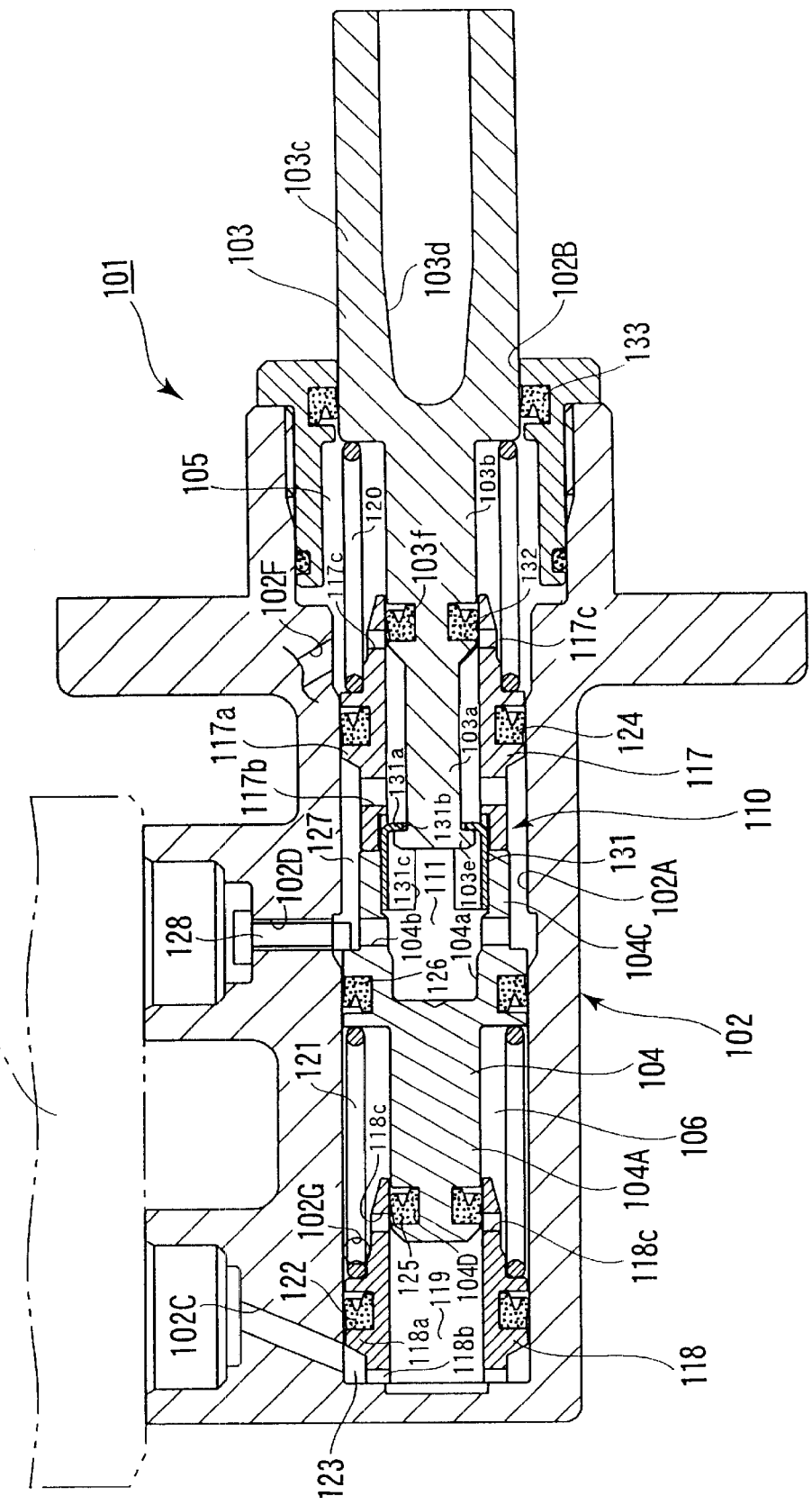
FIG. 5 is a longitudinal section of a second embodiment of the invention.

FIG. 5 shows a second embodiment of the invention. In the second embodiment, a body 104 is formed separately from a first sleeve 117, and they are disposed in axially tandem relationship and in abutment against each other to define a secondary piston 110. In the first embodiment, the retainer 31 mounted on the body 4 of the secondary piston 10 is used to maintain the primary piston 3 in its inoperative position, but in the second embodiment, a substantially cylindrical retainer 131 maintains a primary piston 103 in its inoperative position.

Specifically, the retainer 131 includes a detent 131a at its rear end which extends radially inward, and a through-opening 131b is formed inside the detent 131a. The retainer 131 is formed with a notch 131c which axially continues from the through-opening 131b.

The notch 131c of the retainer 131a is engaged with a reduced diameter portion 103a of the primary piston 103 from the radially outer side and then the retainer 131 is turned through 90° forwardly so that a flange 103e of the primary piston 103 is located inside the retainer 131 to be detented by the detent 131a. Under this condition, the outer periphery of the retainer 131 is disposed, at its front end, as a gentle press fit into the inner peripheral surface of the body 104 toward its rear end, thereby integrally connecting the body 104 and the retainer 103 of the secondary piston 110.

When so connected, the detent 131a and its adjacent portion of the retainer 131 projects rearward beyond the rear end face of the body 104, but such projecting portion is inserted into inner peripheral surface of the first sleeve 117.

In other respects, the arrangement is similar to the first embodiment, and accordingly, corresponding parts to those shown in the first embodiment are designated by like reference numerals as used before, to which 100 is added.

The second embodiment thus constructed is also capable of achieving a similar functioning and effect as achieved by the first embodiment.

While the body 104 and the first sleeve 107, which are separately formed, are used to define the secondary piston 110 in the second embodiment, it should be understood that the secondary piston 110 may comprise the body 104 and the first sleeve 117 which are integrally formed.

Third Embodiment

Figure 6:
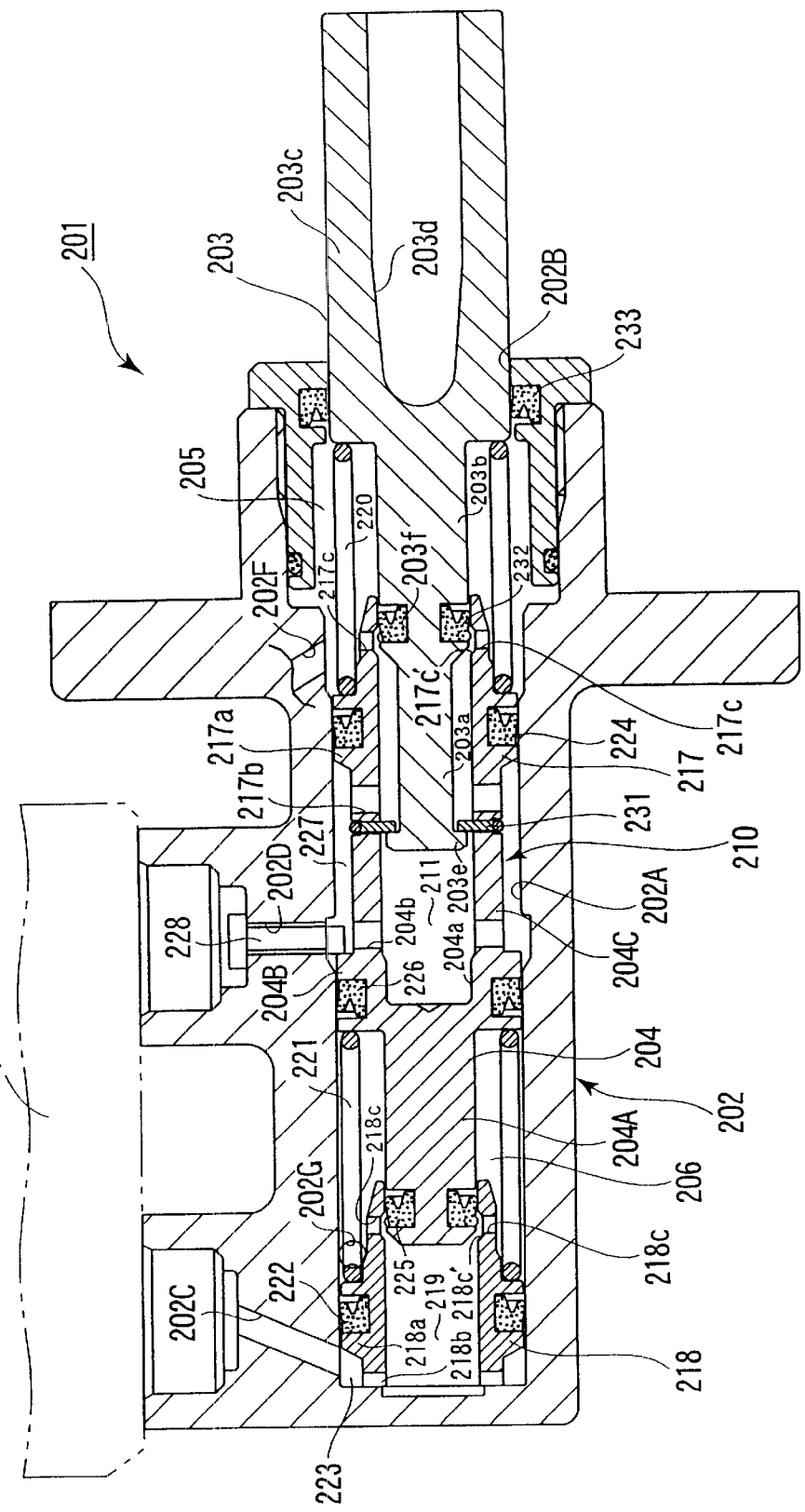
FIG. 6 is a longitudinal section of a third embodiment of the invention.

FIG. 6 shows a third embodiment of the invention. In the third embodiment, in the region of the inner opening of a communication path 218c, the inner peripheral surface of a second sleeve 218 is formed with an annular groove 218c' which increases the groove width toward the inner periphery. A similar annular groove 217⁻ is also formed in the region of the inner opening of a communication path 217c formed in a first sleeve 217. In other respects, the arrangement is similar to the first embodiment, and accordingly, corresponding paths to those shown in the first embodiment are designated by like reference numerals as used before, to which 200 is added.

The third embodiment thus constructed is also capable of achieving a similar functioning and effect as achieved by the first embodiment. It will be noted that in the third embodiment, the annular groove 218⁻ (or 217c⁻) is formed at the location of the inner opening of the communication path 218c (or 217c). Accordingly, the suction effect of drawing the braking liquid from a second reservoir chamber 219 (217) toward a second liquid pressure chamber 206 (or first liquid pressure chamber 205) can be improved as compared with the first and the second embodiment.

It is to be noted that an annular groove similar to the annular groove 218c⁻ (or 217c⁻) of the third embodiment may be provided in the region of the inner opening of the both communication paths 118c (or 117c) in the second embodiment shown in FIG. 5.

While the invention has been described above in connection with several embodiments thereof, it should be understood that a number of changes, modifications and substitutions therein are possible in light of the above disclosure without departing from the spirit and the scope of the invention defined by the appended claims.

What it claimed is:

1. A master cylinder comprising a primary piston disposed to be reciprocable within an axial bore of housing toward a rear end thereof and stepped to include a reduced diameter portion and an increased diameter portion; a secondary piston disposed to be reciprocable within the axial bore of the housing toward a front end thereof and having an axial bore which opens in the rearward direction; a first sleeve disposed rearward of the secondary piston and slidably fitted into the inner peripheral surface of the housing; a first reservoir chamber defined by the inner peripheral surface of the axial bore of the secondary piston and the reduced diameter portion of the primary piston and into which a braking liquid in a reservoir is normally introduced; a first liquid pressure chamber defined by the increased diameter portion of the primary piston, the first sleeve and the inner peripheral surface of the housing; and a second liquid pressure chamber formed adjacent to the secondary piston within the housing for generating a liquid pressure therein as the secondary piston is driven forward;

characterized in that the reduced diameter portion of the primary piston is slidably fitted into the axial bore in the secondary piston, a retraction limit member which defines a retraction end of the primary piston being mounted on on of the first sleeve or the secondary piston.

2. A master cylinder according to claim 1 in which the retraction limit member which restricts the retraction end of the secondary piston is mounted on the housing.

3. A master cylinder according to claim 1, in which the secondary piston and the first sleeve are formed in an integral manner.

4. A master cylinder according to claim 1, in which the cross-sectional area with which the secondary piston faces the second liquid pressure chamber is substantially equal to the cross-sectional area with which the secondary piston faces the first liquid pressure chamber.

5. A master cylinder according to claim 1, in which the secondary piston has a stepped outer peripheral surface including a reduced diameter portion and an increased diameter portion, and further comprising a second sleeve having an axial bore which opens in the rearward direction and into which the reduced diameter portion of the secondary piston is slidably fitted; a second reservoir chamber defined by the inner peripheral surface of the axial bore in the second sleeve and the reduced diameter portion of the secondary piston and into which a braking liquid in the reservoir is normally introduced; and a second liquid pressure chamber defined by the increased diameter portion of the secondary piston, the second sleeve and the inner peripheral surface of the housing, a seal member being provided between the second sleeve and the housing to permit a flow of liquid from the reservoir chamber to the second liquid pressure chamber while blocking a flow of a liquid from the second liquid chamber into the reservoir chamber.

6. A master cylinder according to claim 1, further comprising a first port formed radially through the first sleeve to provide a communication between the first liquid pressure chamber and the first reservoir chamber when inoperative, the communication being interrupted by the reduced diameter portion of the primary piston when operative as the primary piston is driven forward; a second port formed radially through the second sleeve to provide a communication between the second liquid pressure chamber and the second reservoir chamber when inoperative, the communication being interrupted by the reduced diameter portion of the secondary piston when operative as the primary piston is driven forward; at least one of the first port and the second port being formed, in its inner peripheral surface disposed toward the reservoir, with a circumferential groove which increases the quantity of a liquid flow therethrough when inoperative.

7. A master cylinder according to claim 1, in which the secondary piston and the first sleeve are separate from each other, the retraction limit member for the primary piston being disposed in the axial bore of the housing and located rearward of the secondary piston.

* * * * *